United States Patent
Fanini et al.

(10) Patent No.: US 9,874,088 B2
(45) Date of Patent: Jan. 23, 2018

(54) WELLBORE FLOWMETER

(71) Applicant: Baker Hughes Incorporated, Houston, TX (US)

(72) Inventors: Otto N. Fanini, Houston, TX (US); Mohamed Daoud, Houston, TX (US)

(73) Assignee: Baker Hughes, a GE Company, LLC, Houston, TX (US)

( * ) Notice: Subject to any disclaimer, the term of this patent is extended or adjusted under 35 U.S.C. 154(b) by 302 days.

(21) Appl. No.: 14/460,569

(22) Filed: Aug. 15, 2014

(65) Prior Publication Data

US 2016/0047229 A1 Feb. 18, 2016

(51) Int. Cl.
*G01F 1/10* (2006.01)
*E21B 47/10* (2012.01)

(52) U.S. Cl.
CPC ............... *E21B 47/10* (2013.01); *G01F 1/10* (2013.01)

(58) Field of Classification Search
None
See application file for complete search history.

(56) References Cited

U.S. PATENT DOCUMENTS

| | | | |
|---|---|---|---|
| 2,108,245 A | 2/1938 | Ash, Jr. | |
| 2,636,383 A * | 4/1953 | More | E21B 47/10 33/544.2 |
| 3,076,334 A * | 2/1963 | Wilcy | E21B 47/10 73/152.26 |
| 3,249,160 A | 5/1966 | Messerschmitt | |
| 3,630,078 A * | 12/1971 | Bonnet | G01F 1/115 73/152.35 |
| 3,918,831 A | 11/1975 | Grennan | |
| 3,934,467 A | 1/1976 | Nicolas | |
| 4,033,187 A | 7/1977 | Nicolas | |
| 4,102,188 A * | 7/1978 | Simerl | G01P 5/07 73/170.01 |
| 4,139,330 A | 2/1979 | Neal | |
| 4,435,978 A | 3/1984 | Glatz | |
| 4,610,309 A * | 9/1986 | O'Brien | G01V 11/005 166/206 |
| 4,852,401 A | 8/1989 | Hrametz et al. | |
| 4,928,758 A | 5/1990 | Siegfried | |
| 5,251,479 A | 10/1993 | Siegfried, II et al. | |
| 5,831,177 A | 11/1998 | Waid et al. | |
| 6,161,994 A | 12/2000 | Lang | |

(Continued)

FOREIGN PATENT DOCUMENTS

EP 1 534 952 B1 3/2014

OTHER PUBLICATIONS

PCT International Searching Authority dated Oct. 21, 2015.

*Primary Examiner* — Jill Culler
(74) *Attorney, Agent, or Firm* — Bracewell LLP; Keith R. Derrington (57) ABSTRACT

A flowmeter for use in a wellbore that has vane assemblies that deploy from a rotating segment. The vane assemblies project a variable distance away from the rotating segment, so that the flowmeter adjust to varying flow conditions. The variable distance of the vane assemblies also allows use of the flowmeter in different sized wellbores. An example flowmeter includes vane assemblies of varying length that are selectively deployed depending on operating conditions. Other vane assemblies have vane elements with a pitch that varies in response to wellbore and fluid flow operating parameters.

19 Claims, 8 Drawing Sheets

(56) References Cited

U.S. PATENT DOCUMENTS

| | | | |
|---|---|---|---|
| 6,543,726 B2 | 4/2003 | Illingworth | |
| 6,726,439 B2 | 4/2004 | Mikhail et al. | |
| 7,425,774 B2 | 9/2008 | Shibata et al. | |
| 7,784,339 B2 * | 8/2010 | Cook | E21B 43/11 73/152.29 |
| 8,800,384 B2 | 8/2014 | Wootten | |
| 2004/0112587 A1 | 6/2004 | Van Drentham Susman et al. | |
| 2013/0115047 A1 | 5/2013 | Sheth et al. | |

\* cited by examiner

WELLBORE FLOWMETER

BACKGROUND OF THE INVENTION

1. Field of Invention

The present disclosure relates in general to a flowmeter for use in measuring flow in a wellbore. More specifically, the present disclosure relates to a wellbore flowmeter that can adjust to different flow rates in the wellbore to minimize pressure losses from the flowmeter.

2. Description of Prior Art

Flowmeters are often used for measuring flow of fluid produced from hydrocarbon producing wellbores. Flowmeters may be deployed downhole within a producing wellbore, a jumper or caisson used in conjunction with a subsea wellbore, or a production transmission line used in distributing the produced fluids. Monitoring fluid produced from a wellbore is useful in wellbore evaluation and to project production life of a well. In some instances transmission lines may include fluid produced from wells having different owners. Therefore proper accounting requires a flow measuring device that monitors the flow contribution from each owner.

The physical presence and placement of most flowmeters introduces pressure losses into the overall flow of fluid in the wellbore. The amount of pressure loss in the wellbore fluid flow can be affected by the size and configuration of the flowmeter. Flowmeters are generally designed so that the pressure losses they introduce are negligible with respect to the pressure of the measured fluid. However, in some instances production from the wellbore can fluctuate and operate at a reduced flow rate, which in turn causes the flowmeter generated pressure losses to exceed a negligible value and begin to introduce error into the measured flowrate.

SUMMARY OF THE INVENTION

Disclosed herein is an example of a flowmeter for use in a wellbore which includes a body, where the body is made up of an upper housing and a lower housing that is rotatable with respect to the upper housing. Vane assemblies couple to the lower housing and that selectively pivot radially outward into a path of fluid flowing through the wellbore. A pivoting actuator couples to the vane assemblies, and that is axially moveable within the body from a retracted position with the vane assemblies retracted adjacent the body, to an extended position with the vane assemblies extended radially away from the body. Coils may be included in the lower housing that communicate with coils in the upper housing. A controller can optionally be used for controlling operation of the pivoting actuator. The vane assemblies can be planar vane elements that are in a plane disposed at an angle oblique to the path of fluid flowing through the wellbore. In this example the vane assemblies further comprise elongate vane posts, each vane post having a free end with a vane element, and an end distal from the free end that is coupled to the pivoting actuator in the body, wherein one of the vane posts extends radially outward so that a vane element on the end of the one of the vane posts is proximate an inner surface of the wellbore. Further optionally, the pivoting actuator is made up of a deployment mandrel having teeth on an axially oriented surface of the mandrel that couple with teeth on a curved surface of one of the vane assemblies, so that axially moving the mandrel in one direction pivots the vane element towards the body, and axially moving the mandrel in another direction pivots the vane element away from the body. The flowmeter can further have a motor driven shaft in the body for axially moving the deployment mandrel. In an alternative, a plurality of deployment mandrels are axially moveable by the shaft, and wherein each deployment mandrel has teeth on an axially oriented surface of the mandrel that couple with teeth on a curved surface of one of the vane assemblies, so that axially moving the mandrel in one direction pivots the vane element towards the body, and axially moving the mandrel in another direction pivots the vane element away from the body. In another embodiment, the vane assemblies have an elongate vane post with an end pivotingly mounted to the body, vane elements rotatably on the post, and a linkage rod that connects to ends of the vane elements, so that when the vane post is moved into an extended position, the vane elements rotate into an orientation that is substantially perpendicular with the vane post. A pinned connection may be included that extends through a middle section of each of the vane elements and into the vane post, so that each of the vane elements are rotatable about the pinned connections. The vane assemblies can contain an elongate vane post having an end pivotingly mounted to the body, planar vane elements on the post, wherein the planar vane elements each have a lateral edge, and pivot about the vane post along the lateral edge so that an enlarged surface of the planar vane element is in a plane substantially perpendicular to the path of fluid flowing through the wellbore.

An alternate example of a flowmeter for use in a wellbore encompasses an upper body, a lower body coupled with the upper body and rotatable with respect to the upper body, vane elements coupled to the lower body and that are pivotable from a retracted position adjacent with the lower body, to an extended position that is radially outward from the lower body and that are oriented at an angle oblique to a path of a flow of fluid through the wellbore, so that when the fluid flows past the lower body, the flow of fluid imparts a force onto the vane elements that rotates the lower body. Also in this example is a deployment assembly coupled with the vane elements and that is retracted when the vane elements are in the retracted position and that is extended with the vane elements are in the extended position. A controller is in communication with the lower body and the deployment assembly. In an example, the controller provides command signals to the deployment assembly based on a signal received from the lower body. Alternatively, at least some of the vane elements are mounted on vane posts that are pivotingly coupled to the lower body, and wherein the deployment assembly has an elongate connector arm that is selectively urged axially within the lower body and has an end connected to a scissor arm linkage, wherein ends of the scissor arm linkage distal from the connector arm are pinned to the vane posts.

Also disclosed is a method of measuring flow in a wellbore that involves providing a flowmeter that has an upper body, a lower body rotatingly coupled with the upper body, and vane elements coupled with the lower body. The flowmeter is disposed in the wellbore and in a path of a flow of fluid, and the vane elements are pivoted from a stowed position adjacent the lower body to a deployed position radially outward from the body so that the flow of fluid impinges on the vane elements and generates a force that rotates the lower body. Rotation of the lower body is sensed. A step of estimating a flowrate of the flow of fluid in the wellbore based on the sensed rotation of the lower body can be included. The method can further include controlling a distance of the vane elements away from the lower body based on an estimate of the flowrate of the flow of fluid.

BRIEF DESCRIPTION OF DRAWINGS

Some of the features and benefits of the present invention having been stated, others will become apparent as the description proceeds when taken in conjunction with the accompanying drawings, in which.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will full fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Figure 1:
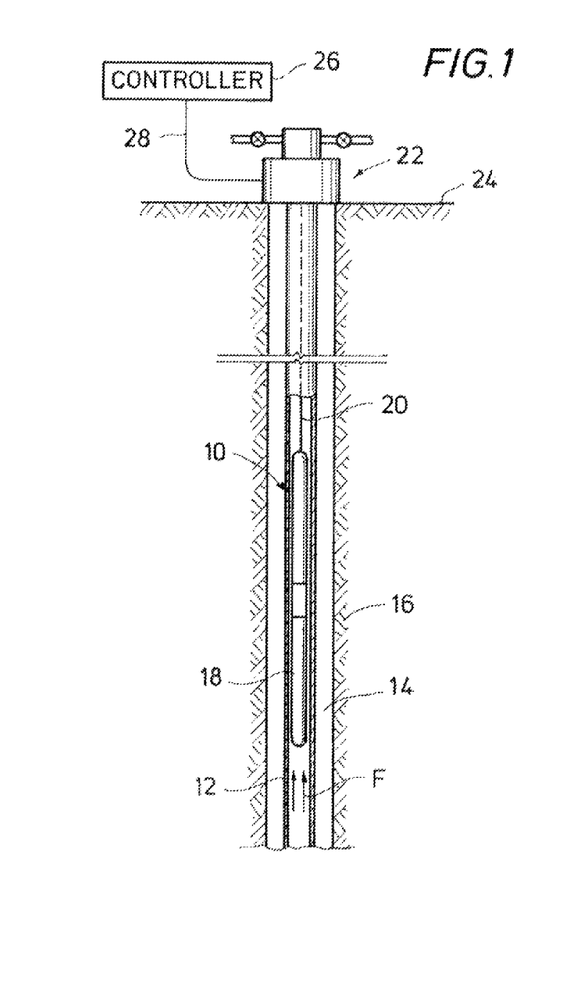
FIG. 1 is a side sectional view of an example of a flowmeter system disposed in a wellbore.

Shown in side sectional view in FIG. 1 is one example of a flowmeter assembly 10 mounted within tubing 12 which is suspended within a wellbore 14. Flowmeter assembly 10 is disposed in a path of a flow of fluid F and is for measuring a flowrate of the fluid shown flowing within the tubing 12. Wellbore 14 intersects a formation 16 and wherein the fluid F making up the flow is being produced from formation 16. In the example of FIG. 1, flowmeter assembly 10 is mounted within a sonde 18 which is lowered into wellbore 14 on wireline 20. Wellhead assembly 22 is shown mounted on surface 24 and above the opening of wellbore 14. Optionally, a controller 26 is provided at surface and connects to wireline 20 via control line 28 shown connecting to an outer surface of wellhead assembly 22. In one example, controller 26 is in communication with flowmeter assembly 10, and may receive signals from flowmeter assembly 10 representative of the flow rate of the fluid F. Moreover, examples exist wherein command signals may be relayed from controller 26 and via control line 28 through wireline 20 and to flowmeter assembly 10. As will be described in more detail below, control signals can include adjusting the configuration of the flowmeter assembly 10 to match the flow conditions of the fluid F as well as diameter of tubing 12. Optionally, sonde 18 and/or flowmeter assembly 10 may be deployed in a wellbore wherein only casing (not shown) lines the wellbore and without tubing, or an open hole wellbore where casing is not present.

Figure 2:
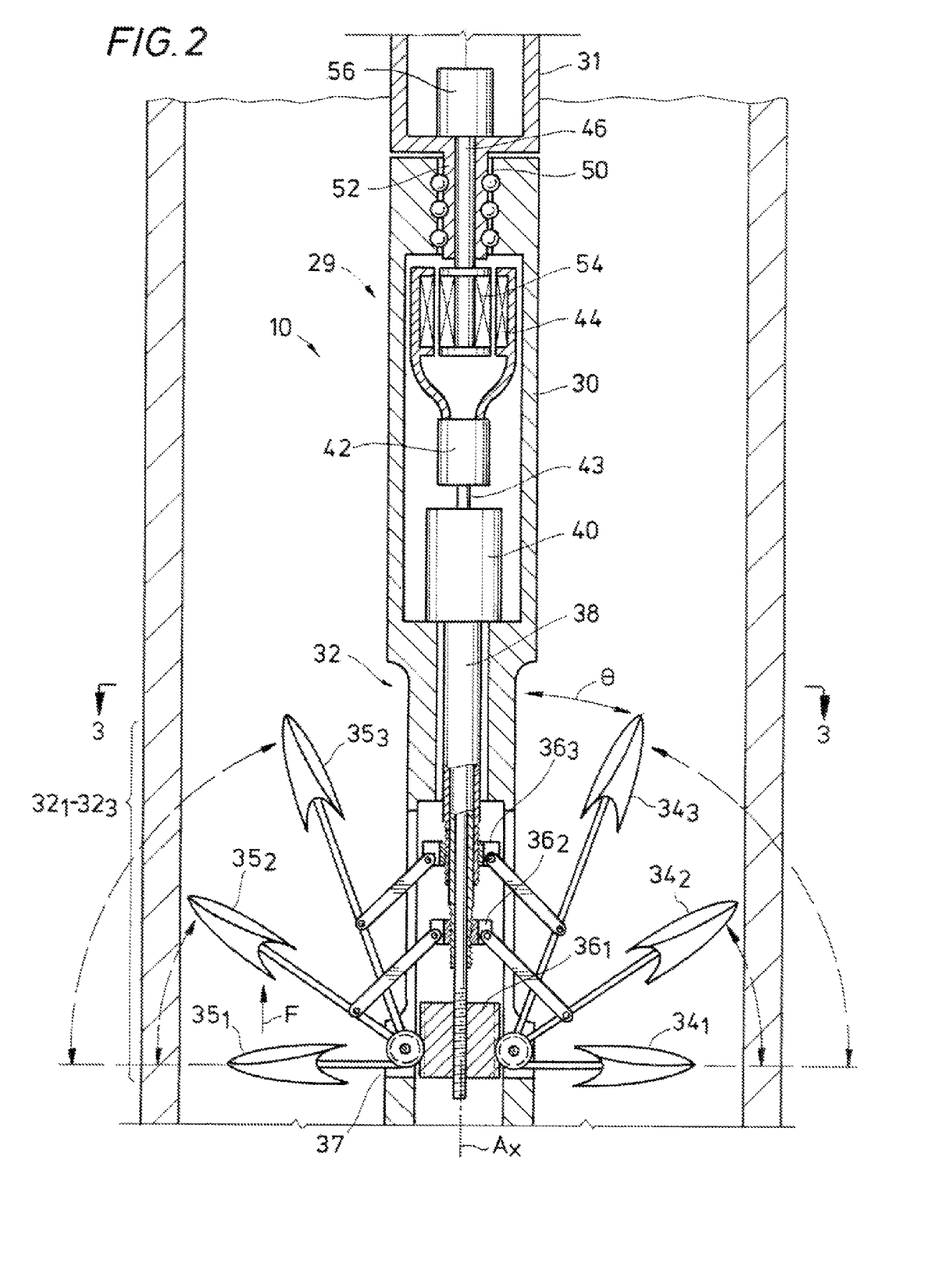
FIG. 2 is a side sectional view of a flowmeter for use with the system of FIG. 1.

FIG. 2 shows a side partial sectional view of one example of flowmeter assembly 10, where in this example assembly 10 includes a body 29 that is made up of lower and upper housings 30, 31. Pivotingly mounted to the lower housing 30 are a series of vane assemblies $32_1$-$32_3$ that may pivot radially outward as illustrated by angle θ from the lower body 30 and into the flow path of fluid F. When stowed or in a retracted position, the vane assemblies $32_1$-$32_3$ are adjacent the housing 30 and within a recess 33 shown formed axially along a portion of the outer surface of lower housing 30. The vane assemblies $32_1$-$32_3$ include a series of vane elements $34_1$-$34_3$, wherein vane elements $34_2$, $34_3$ are mounted on elongated vane posts $35_2$, $35_3$. Each of the vane assemblies $32_1$-$32_3$ are coupled respectively with an annular deployment mandrel $36_1$-$36_3$, which are shown coaxially disposed within lower housing 30. Axially moving the deployment mandrels $36_1$-$36_3$ within housing 30 causes the vane assemblies $32_1$-$32_3$ to selectively pivot radially outward from housing 30.

Figure 2A:
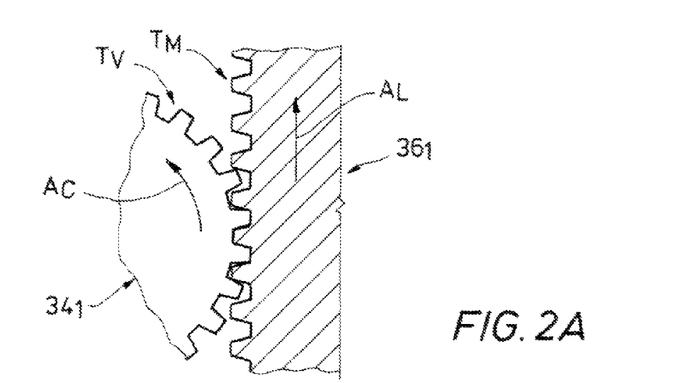
FIG. 2A is a side sectional view of a portion of FIG. 2 illustrating interaction between gear teeth a vane element and deployment mandrel and in an enlarged view.

One example of the coupling between the mandrels $36_1$-$36_3$ and vane assemblies $32_1$-$32_3$ is shown in sectional view in FIG. 2A. Here a series of teeth $T_M$ are shown on an outer surface of mandrel $36_1$ and which mesh with teeth $T_V$ on an outer surface and lower end of vane element $34_1$. As illustrated by the arrows $A_L$, $A_C$, axial movement of mandrel $36_1$ upward causes outward rotation of the vane element $34_1$. In the examples of the coupling interaction between mandrels $36_2$, $36_3$ and vane posts $35_2$, $35_3$, teeth (not shown) are on an end of posts $35_2$, $35_3$ proximate the outer surfaces of mandrels $36_2$, $36_3$. Accordingly, the combination of the teeth $T_M$, $T_V$ on the mandrels $36_1$-$36_3$, vane element $34_1$, and vane posts $35_2$, $35_3$ make up and define a pivot coupling 37 (FIG. 2).

The mandrels $36_1$, $36_3$ are shown circumscribing an elongate deployment rod 38 which depends from an end of a motor 40, where rod 38 and motor are disposed in lower housing 30. The rod 38, in one example, is selectively configured with threads (not shown) that mate with threads (not shown) formed on an inner facing surface of one of the mandrels $36_1$, $36_3$, so that selectively axially moving and rotating rod 38 may move the mandrels 36$_1$, 36$_3$ in a desired axial direction. It is believed that it is within the capabilities of those skilled in the art to strategically locate the respective threads for axially moving the mandrels 36$_1$, 36$_3$ in a designated or desired axial direction. An optional controller 42 is shown in communication with motor 40 via control line 43, controller may be equipped with hardware and/or software programmed for directing command signals to motor 40 to strategically operate motor 40 and for deploying or retracting vane assemblies 32$_1$-32$_3$.

Coupled to an end of controller 42 is a coil 44 which is set within lower housing 30 and is in communication with coil 46 disposed within a lower portion of upper housing 31. Examples of communication conveyed between coil 44 and coil 46 includes data, signals, and electrical power. As shown, lower housing 30 includes a recess 50 its upper end that projects radially outward a distance from axis A$_X$ and in which a correspondingly shaped protrusion 52 on the lower end of upper housing 31 is inserted. Bearings 54 are shown placed in channels that circumscribe protrusion 52; bearings 54 provide rolling surfaces to facilitate rotation of the lower housing 30 with respect to upper housing 31. Coil 46 is shown connected to a controller 56 also disposed in upper housing 31.

Figure 3:
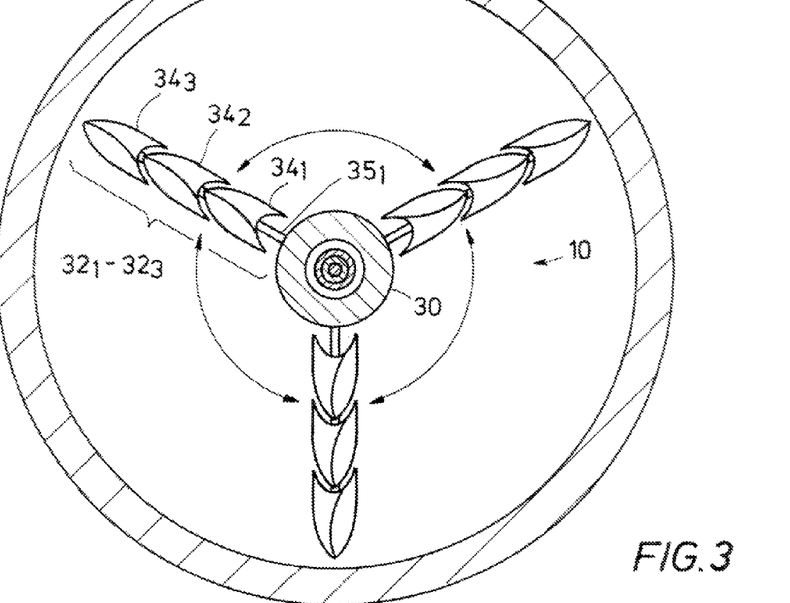
FIG. 3 is an axial view of a portion of the flowmeter of FIG. 2 taken along lines 3-3.

FIG. 3 illustrates an axial view of flowmeter assembly 10 and taken along lines 3-3 of FIG. 2. In this example, each of the vane assemblies 32$_1$-32$_3$ are shown deployed radially outward and away from body 30, so that each vane element 34$_1$-34$_3$ is in the flow path of fluid F (FIG. 2). Alternatively in this example, vane element 34$_1$ is mounted on a corresponding vane post 35$_1$ shown coupled with body 30 and in the manner as described above in regard to FIG. 2 the vane post 35$_2$, 35$_3$. As indicated above, changes in flow rate of the fluid F can in some instances result in a pressure drop across the flowmeter assembly 10 which has sufficient magnitude to affect the results obtained by the flowmeter assembly 10. In low flow situations, the controller 56, or controller 26 (FIG. 1), can direct controller 42 (FIG. 2) to actuate motor 40 as described above to reduce the exposure of the vane elements 34$_1$-34$_3$ so that a meaningful flow rate value may be obtained. In one example, during minimum or low flow conditions, vane assemblies 32$_2$, 32$_3$ may be stowed within recess 33 and only vane assembly 32$_1$ be deployed into the flow of fluid F. Alternatively, in situations of varying diameter tubulars, vane assemblies 32$_2$-32$_3$ may be selectively deployed outward so that the tip of the outermost vane element 34$_1$-34$_3$ is proximate to or adjacent the inner radial surface of a tubular or open hole wellbore in which the flowmeter 10 is disposed. Accordingly, implementation of the device described herein provide flexibility in that it can be disposed in various sizes tubulars or wellbores without any structural changes being done to the device between deployments in different well bores.

Figure 4:
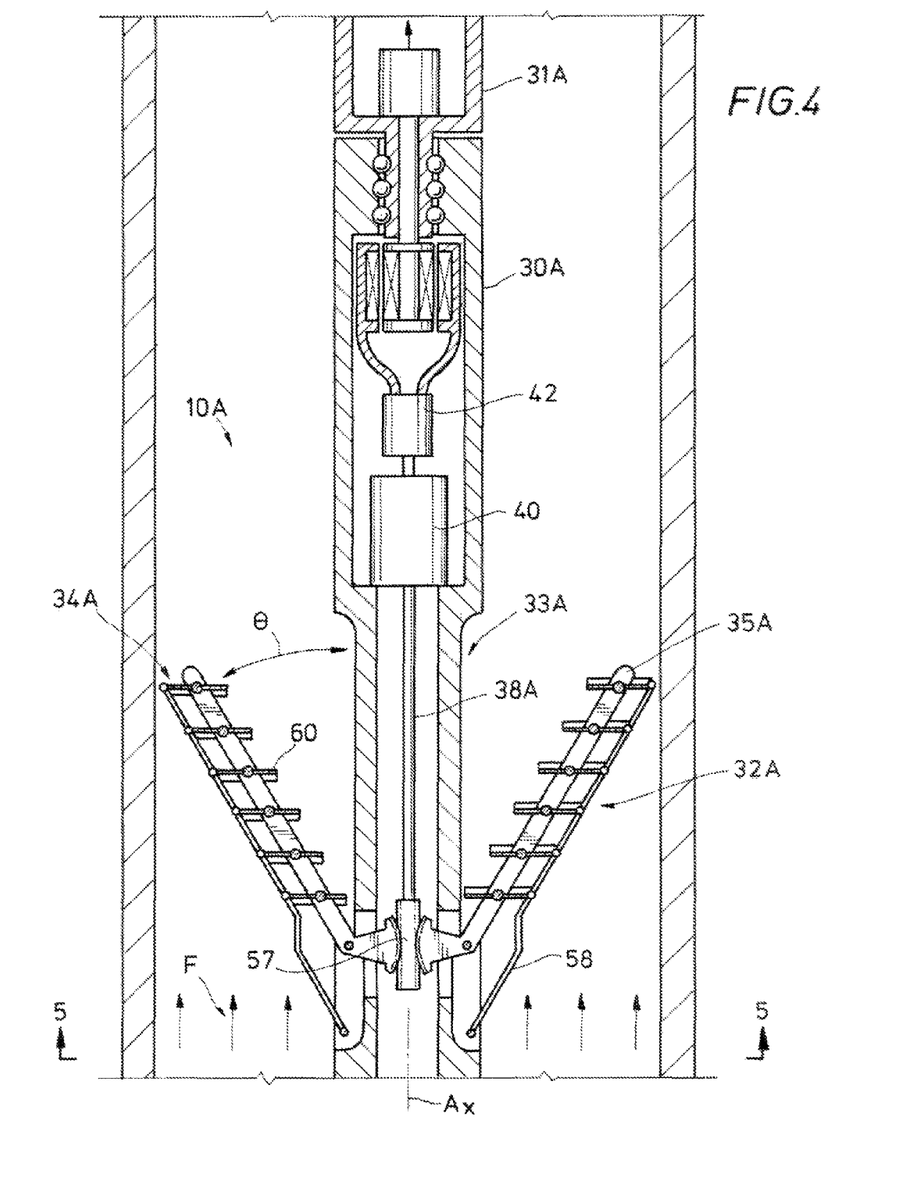
FIG. 4 is a side sectional view of an alternate embodiment of flowmeter for use with the system of FIG. 1.
Figure 4A:
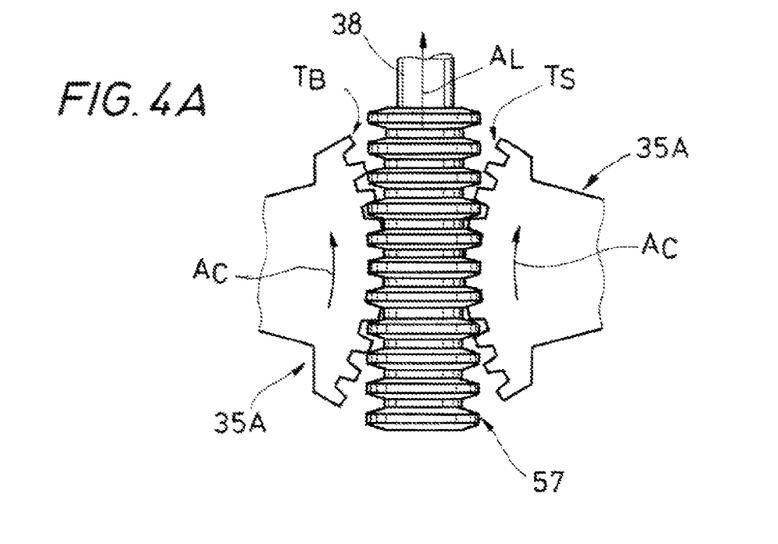
FIG. 4A is a side sectional view of a portion of FIG. 4 illustrating interaction between gear teeth on a vane post and linkage collar and in an enlarged view.

Shown in side sectional view in FIG. 4 is an alternate example of flowmeter assembly 10A. In this example, the vane assemblies 32A are made up of elongate vane posts 35A that have an end coupled with lower housing 30A so the vane posts 35A can be selectively pivoted radially outward from lower housing 30A. Further in the example of FIG. 4, vane elements 34A are planar and elongate elements that are pinned proximate their middle section onto the vane posts 35A and at axially spaced apart locations. An annular linkage collar 57 is mounted on an outer surface of the lower end of deployment rod 38A. As shown in the example of FIG. 4A, linkage collar 57 includes a series of teeth T$_S$ on its outer surface. In the illustrated embodiment, teeth T$_S$ engage teeth T$_B$ that are formed on the portion of posts 35A adjacent housing 30A. As illustrated by arrows A$_L$ and A$_C$, moving linkage collar 57 axially upward engages the respective teeth T$_S$, T$_B$ thereby pivoting the vane posts 35A radially outward.

Figure 5:
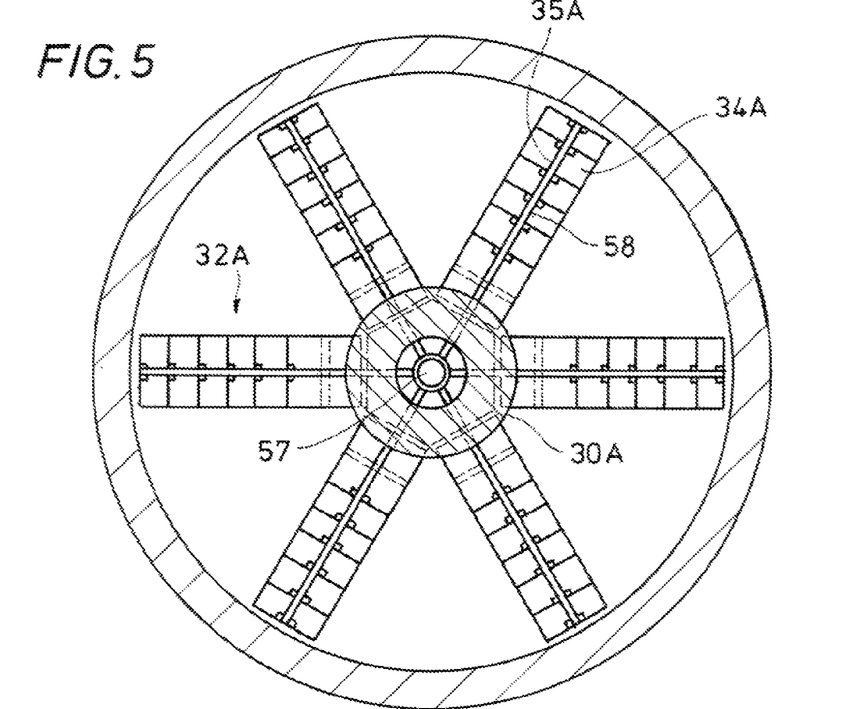
FIG. 5 is an axial view of a portion of the flowmeter of FIG. 4 taken along lines 5-5.

An elongate linkage rod 58 is illustrated that has one end pivotingly anchored in an outer surface of housing 30A, and which runs along the side of vane posts 35A. Linkage rod 58 connects with a lateral portion of each of the vane elements 34A. As the linkage rod 58 is not substantially elastic and retains a generally constant length, as the posts 34A are drawn radially outward from housing 30A, the vane elements 34A rotate about that pinned connection and so that they are generally perpendicular with the elongate side of the vane posts 35A. Moreover, in this example the vane elements 34A are not substantially flat but instead are curved so that when disposed within the flow of fluid F, they produce a resultant rotational force to cause rotation of the lower housing 30A with respect to upper housing 31A. FIG. 5 shows an axial view of flowmeter assembly 10A taken along lines 5-5 of FIG. 4. As shown, the vane assemblies 32A are in a deployed position and the vane elements 34A have their elongate sides in a direction generally perpendicular with the elongate side of the vane posts due to the strategic positioning and dimensioning of the linkage rod 58.

Figure 6:
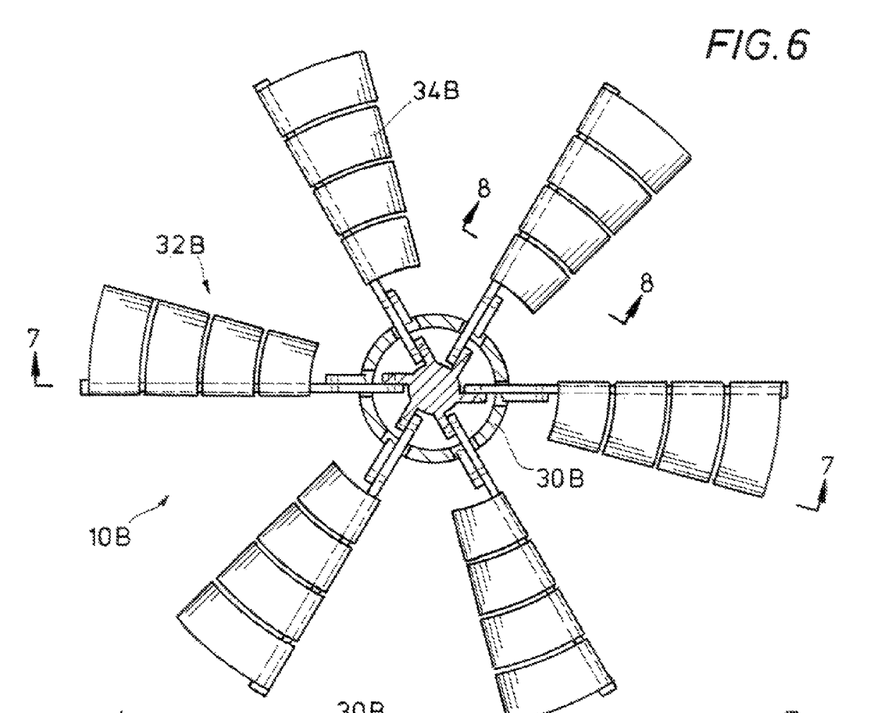
FIG. 6 is an axial view of another alternate embodiment of rotating elements for use in a flowmeter.
Figures 7, 8:
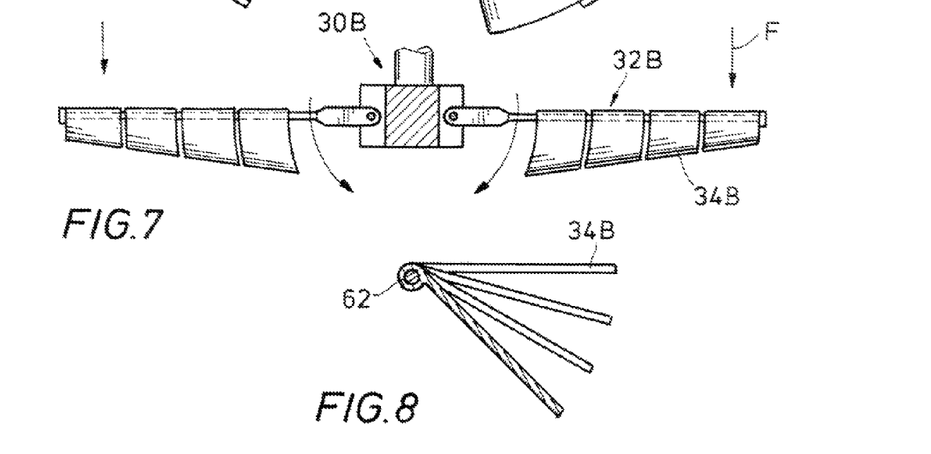
FIG. 7 is a sectional view of rotating elements of FIG. 6 taken along lines 7-7.
FIG. 8 is a sectional view of rotating elements of FIG. 6 taken along lines 8-8.
Figure 9:
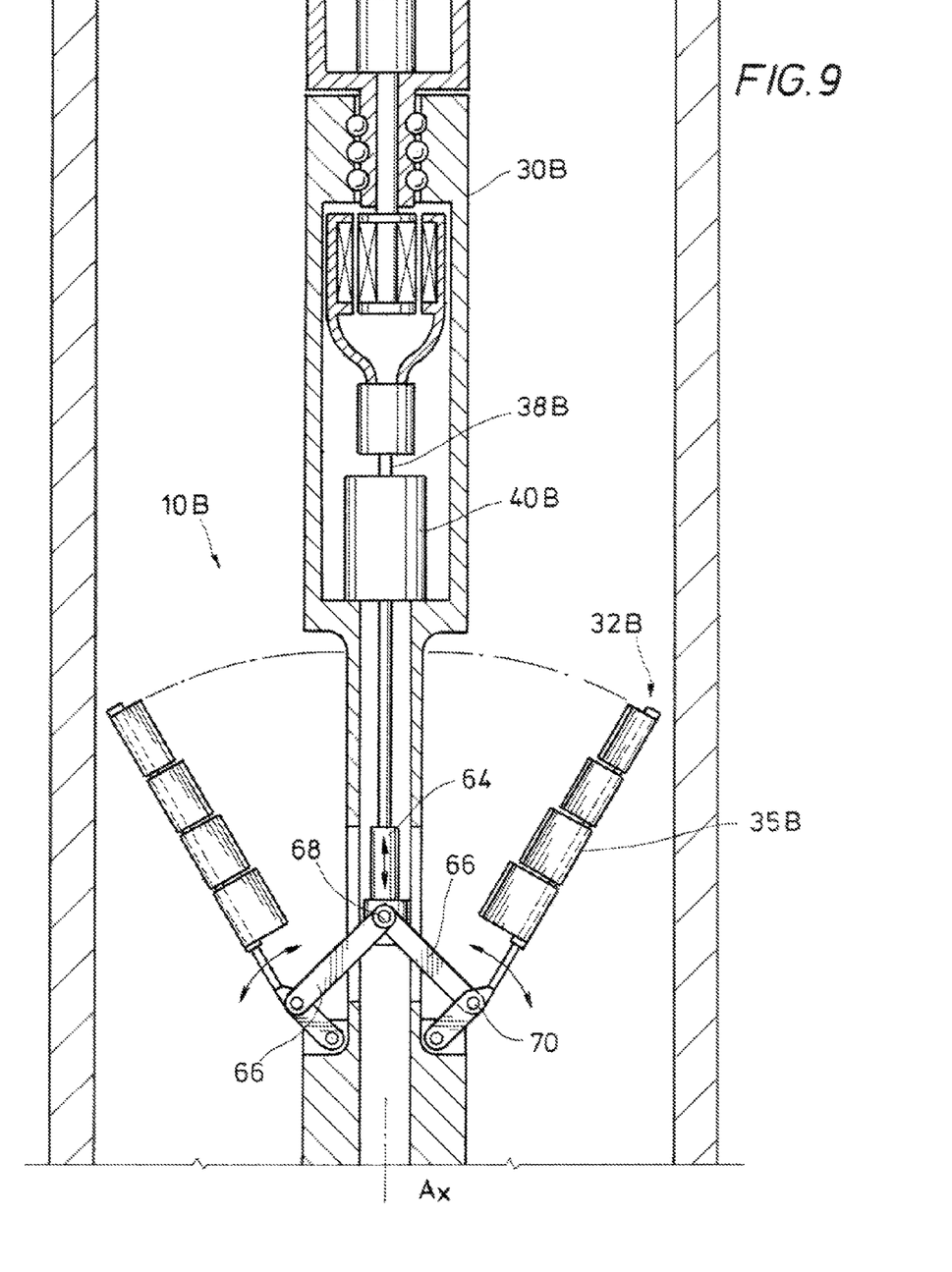
FIG. 9 is a partial sectional view of a flowmeter having the rotating elements of FIG. 6.

Illustrated in FIGS. 6 through 9 are alternate embodiments of a flowmeter assembly 10B, wherein individual vane members 34B are pivoted on their lateral sides and to create a windmill type arrangement of the vane assemblies 32B that project radially outward from housing 30B. FIG. 6 illustrates an axial view whereas FIG. 7 shows a sectional view and taken along lines 7-7 of FIG. 6. As shown, the vane elements 34B depend downward from an upper surface of the vane assemblies 32B so that an asymmetric force can be generated from interaction with the flow of fluid F and induce the rotation of the vane assemblies and body 30B. FIG. 8, which is a side sectional view taken along lines 8-8 of FIG. 6, illustrates stages of how an individual vane element 34B can rotate about a pivot 62B that runs along a lateral edge of the element 34B. Referring now to FIG. 9, a side sectional view of the alternate embodiment of the flowmeter assembly 10B is illustrated wherein the deployment mechanism for the vane assemblies 32B is illustrated. In this example, an elongate connector arm 64 connects to an end of deployment rod 38 and can be moved axially within housing 30B based upon action of motor 40B. A pin connection provides connectivity between connector arm and a scissor arm 66. Scissor arm 66 connects to the connector arm 64 via a pin connection 68. A pin connection 70 provides connection of the scissor arm 66 to the vane posts 35B.

Figure 10:
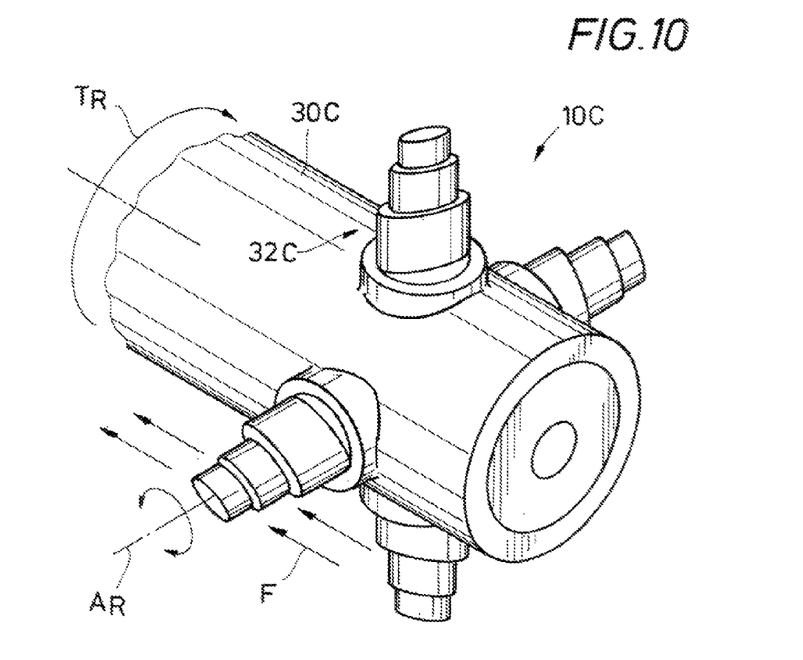
FIG. 10 is a perspective view of an alternate example of a flow meter with rotatable vane assemblies.
Figure 11:
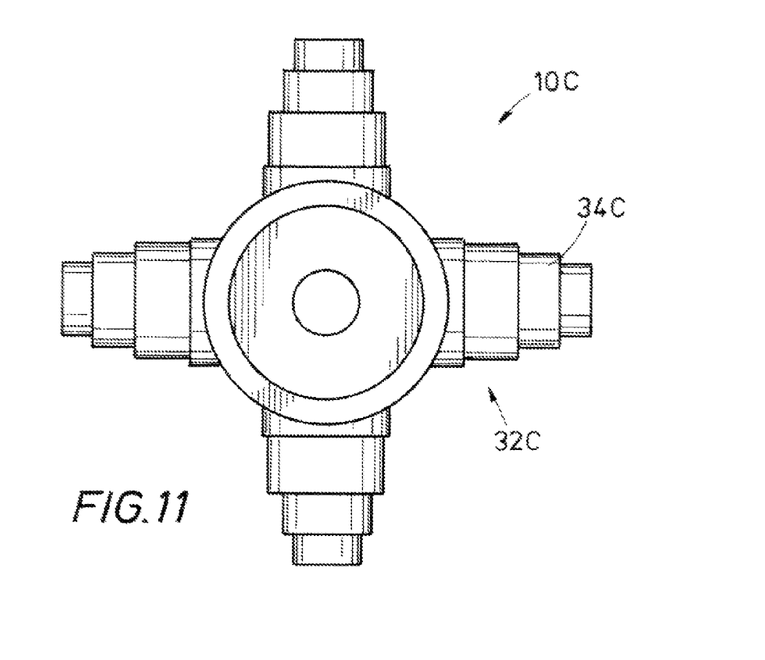
FIG. 11 is an axial view of the flow meter of FIG. 10.

In the alternate example of FIG. 10, flowmeter 10C is illustrated in a perspective view and which is equipped with vane assemblies 32C on its lower housing 30C that may gimbal about an axis A$_R$ shown projecting radially outward from lower housing 30C. As illustrated, a rotational torque T$_R$ is exerted onto the lower housing 30C from the flow of fluid F interacting with the vane assemblies 32C. Gimbaling the vane assemblies 32C adjusts their aspect ratio to the flow of fluid F thereby altering the magnitude of the rotational torque T$_R$. Similar to that described above where adjustments to the flowmeter 10C are made depending on the flow rate of the flow of fluid F or dynamic losses across the flowmeter 10C, the vane assemblies 32C can be gimbaled to a particular orientation to ensure meaningful results are obtained. In addition to gimbaling the vane assemblies 32C, as illustrated in an axial view in FIG. 11, vane elements 34C within the vane assemblies 32C can be selectively telescoped radially inward or outward depending on operating conditions, i.e. flow rate, pressure drop, or tubular inner diameter.

Figure 12:
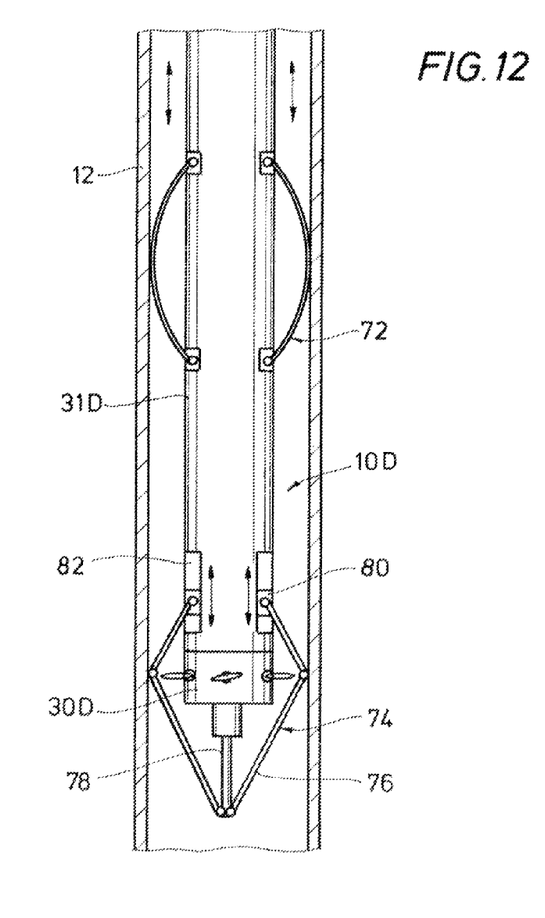
FIG. 12 is a side view of an alternate example of a flow meter.

Referring to FIG. 12, another alternate example of a flowmeter 10D is shown in a partial side sectional view with the flowmeter 101) disposed in tubing 12. In this example, an upper centralizer 72 is provided on the upper housing 31D for positioning the flowmeter 10D at a designated position within the tubing 12. In an example, the designated position is the flowmeter 10D is to be substantially coaxial with the tubing 12. The centralizer 72 is made up of semi-circular spring like members whose ends pivotingly couple with the outer surface of the upper housing 31D. Mid-portions of the spring like members project radially outward into contact with the inner surface of the tubing 12. A lower centralizer 74 is shown that extends over an interface between the upper and lower housings 31D, 30D. Lower centralizer 74 includes spring like members whose mid portions include a pivot connection; the mid portions also project radially outward into contact with the tubing 12 to maintain the lower portion of the flowmeter 10D in a designated position within the tubing 12. Lower ends of the members of the lower centralizer 74 pivotingly connect to a post 78 that projects axially downward from a lower end of lower housing 30D. Upper ends of the members of the lower centralizer 74 terminate in cylindrically shaped anchor members 80 that axially slide within grooves 82. Grooves 82 are formed axially along an outer surface of the upper housing 31D.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A flowmeter for use in a wellbore comprising:
    a body comprising an upper housing and a lower housing that is rotatable with respect to the upper housing;
    vane assemblies that couple to the lower housing and that selectively pivot radially outward into a path of fluid flowing through the wellbore, each of the vane assemblies comprises a plurality of planar vane members, and a plurality of elongate vane posts each having ends coupled with a one of the planar vane members and distal ends pivotingly coupled to the lower housing, at least two of the vane posts having different lengths so that when the at least two vane posts are pivoted away from the lower housing the corresponding vane elements are disposed at differing radial distances from an axis of the flowmeter; and
    a pivoting actuator coupled to the vane assemblies, and that is axially moveable within the body from a retracted position with the vane assemblies retracted adjacent the body, to a series of extended positions.

2. The flowmeter of claim 1, further comprising coils in the lower housing that communicate with coils in the upper housing.

3. The flowmeter of claim 1, further comprising a controller for controlling operation of the pivoting actuator.

4. The flowmeter of claim 1, wherein the planar vane elements are selectively moved to within a plane disposed at an angle oblique to the path of fluid flowing through the wellbore.

5. The flowmeter of claim 4, wherein a first vane post extends radially outward so that a first vane element on the end of the first vane post is proximate an inner surface of the wellbore, and wherein a second vane post extends radially outward so that a second vane element on the end of the second vane post is proximate an outer circumference of the housing, and wherein a third vane post extends radially outward so that a third vane element on the end of the third vane post is disposed radially between the first and second vane elements.

6. The flowmeter of claim 4, wherein the pivoting actuator comprises a deployment mandrel having teeth on an axially oriented surface of the mandrel that couple with teeth on a curved surface of one of the vane assemblies, so that axially moving the mandrel in one direction pivots the vane element towards the body, and axially moving the mandrel in another direction pivots the vane element away from the body.

7. The flowmeter of claim 6, further comprising a motor driven shaft in the body for axially moving the deployment mandrel.

8. The flowmeter of claim 7, further comprising a plurality of deployment mandrels, wherein each of the deployment mandrels are axially moveable by the shaft, and wherein each deployment mandrel has teeth on an axially oriented surface of the mandrel that couple with teeth on a curved surface of one of the vane assemblies, so that axially moving the mandrel in one direction pivots the vane element towards the body, and axially moving the mandrel in another direction pivots the vane element away from the body.

9. The flowmeter of claim 1, wherein the vane assemblies are selected from the group consisting of planar vane elements that are in a plane disposed at an angle oblique to the path of fluid flowing through the wellbore, and an elongate vane post having an end pivotingly mounted to the body, vane elements rotatably on the post, and a linkage rod that connects to ends of the vane elements, so that when the vane post is moved into an extended position, the vane elements rotate into an orientation that is substantially perpendicular with the vane post.

10. The flowmeter of claim 9, wherein a pinned connection extends through a middle section of each of the vane elements and into the vane post, so that each of the vane elements are rotatable about the pinned connections.

11. The flowmeter of claim 1, wherein the vane assemblies are selected from the group consisting of planar vane elements that are in a plane disposed at an angle oblique to the path of fluid flowing through the wellbore, and an elongate vane post having an end pivotingly mounted to the body, planar vane elements on the post, wherein the planar vane elements each have a lateral edge, and pivot about the vane post along the lateral edge so that an enlarged surface of the planar vane element is in a plane substantially perpendicular to the path of fluid flowing through the wellbore.

12. A flowmeter for use in a wellbore comprising:
    an upper body, a lower body coupled with the upper body and rotatable with respect to the upper body;
    vane elements coupled to the lower body and that are pivotable from a retracted position adjacent with the lower body, to an extended position that is radially outward from the lower body and that are oriented at an angle oblique to a path of a flow of fluid through the wellbore, so that when the fluid flows past the lower body, the flow of fluid imparts a force onto the vane elements that rotates the lower body;

a deployment assembly coupled with the vane elements and that is retracted when the vane elements are in the retracted position and that is extended with the vane elements are in the extended position;

and a controller in communication with the lower body and the deployment assembly, and that selectively commands the deployment assembly to deploy the vane elements to designated locations in response to an amount of fluid flow in the wellbore.

13. The flowmeter of claim 12, wherein the controller provides command signals to the deployment assembly based on a signal received from the lower body.

14. The flowmeter of claim 12, wherein at least some of the vane elements are mounted on devices that are selected from the group consisting of planar vane elements that are in a plane disposed at an angle oblique to the path of fluid flowing through the wellbore, and vane posts that are pivotingly coupled to the lower body, and wherein the deployment assembly comprises an elongate connector arm that is selectively urged axially within the lower body and has an end connected to a scissor arm linkage, wherein ends of the scissor arm linkage distal from the connector arm are pinned to the vane posts.

15. A method of measuring flow in a wellbore comprising:
providing a flowmeter that comprises an upper body, a lower body rotatingly coupled with the upper body, and vane elements coupled with the lower body;
disposing the flowmeter in the wellbore and in a path of a flow of fluid;
pivoting the vane elements from a stowed position adjacent the lower body to a deployed position radially outward from the body, and along a path that extends oblique to an axis of the flowmeter, so that the flow of fluid impinges on the vane elements and generates a force that rotates the lower body;
adjusting the exposure of the vane elements in response to changes in a flowrate of the flow of fluid; and
sensing the rotation of the lower body.

16. The method of claim 15, further comprising estimating a flowrate of the flow of fluid in the wellbore based on the sensed rotation of the lower body.

17. The method of claim 15, further comprising controlling a distance of the vane elements away from the lower body based on an estimate of the flowrate of the flow of fluid.

18. The method of claim 15, wherein the path comprises a first path, the method further comprising moving the flowmeter to another wellbore having a different sized diameter, and pivoting the vane elements to a second path that is oblique to the first path.

19. The method of claim 15, wherein the deployed position is based on an inner diameter of the wellbore.

* * * * *